Figure 1:
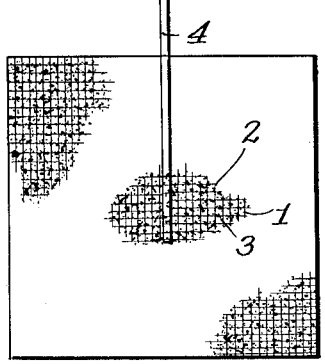

Aug. 12, 1941.   J. B. BRENNAN   2,251,913

ELECTRODE FOR STORAGE BATTERIES

Filed April 1, 1938

Joseph B. Brennan,
INVENTOR.

Patented Aug. 12, 1941

2,251,913

UNITED STATES PATENT OFFICE 2,251,913

ELECTRODE FOR STORAGE BATTERIES

Joseph B. Brennan, Euclid, Ohio

Application April 1, 1938, Serial No. 199,396

10 Claims. (Cl. 136—19)

This invention relates to electrolytic cells and methods of making same, and more particularly to electrodes for electrolytic devices such as storage batteries, electrical accumulators and the like. This application is a continuation in part of my copending application Serial No. 158,105 filed August 9, 1937.

Among the objects of this invention is the making of plates for electrolytic storage cells such as the acid and lead or the alkaline nickel iron, or nickel and cadmium, or nickel and zinc, or nickel and nickel type having sprayed metal surfaces with resultant greater capacities per unit of plane area and per volumetric unit.

Another object is to make electrodes for storage batteries in a simple and inexpensive manner.

Another object is to make a cell of this type having a relatively lower internal resistance than is now attainable by present used methods.

Other objects are apparent to those versed in the art.

These objects are attained by making electrodes by spraying molten metals, such as are ordinarily used in storage battery electrodes, onto perforate members or sheets or strips preferably having conductors extending therefrom preferably of a similar metal to that sprayed.

Many materials are suitable to use as a base. I prefer, however, to use a porous material such as paper, a ceramic material, cloth or woven wire or perforated metal and this base material should be non-corrosive with relation to the elements to be used in the storage battery assembly.

For example, molten nickel may be sprayed onto a nickel screen or cotton gauze or asbestos paper or glass cloth or onto a porous siliceous material such as a filter stone and during or prior to the application of the spray a conductive terminal is so arranged that it may be joined to the layer of sprayed metal so as to make an electrical terminal thereon.

The metal may preferably be made molten in an electrically heated chamber lined with an inert material and may be atomized for spraying through a carbon lined nozzle by projecting a spray of gas or steam around this nozzle so as to atomize the hot molten metal as it emerges from the nozzle or nozzles and project the fine particles onto the base selected for use.

The base may be moved continuously or intermittently under said spray nozzles and coated uniformly or as desired in special areas by masking or the spray nozzles may be moved relatively to the base selected. It is desirable to spray from both sides onto a perforate base since speed and better adhesion may be secured thereby. The degree of porosity in the spray deposited layer may be regulated by regulating the fineness of the spray, the reactiveness of the gas used to atomize and the reactiveness of the atmosphere in which the spraying is carried out.

Multiple layers of perforate base material such as cotton or glass gauze may be used and joined together by the simultaneous spraying from both sides and the terminal may be simultaneously joined to the layer of spray deposit by stitching it therein, or weaving it therein, or laying it therebetween prior to or during the spray operation.

Accordion pleating, folding, or rolling helically or forming into other desired shapes may be resorted to with reference to the permeable electrodes so made by spraying to adapt them to the apparent needs subsequent to the spraying thereof or the base material may be formed prior to the spraying into various shapes.

After the perforate strips are coated with the sprayed metal, for example, such as nickel, having the terminal wires attached thereto, these strips may be further prepared for use as positive plates in storage cells preferably by having a coating of nickelous hydrate formed therein and thereon in a solution having three parts of potassium ferrocyanide and one part of sodium chloride and one part of sodium hydroxide dissolved in two hundred parts of water, polarizing the plate anodically in such solution at a current density of about one-third to one-half ampere per square inch. After complete coating is achieved, the nickel and nickelous hydrate coated and formed strip may be removed from the forming bath and cut into desired sections.

Figure 3:
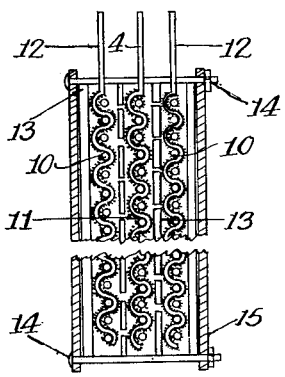
Figure 2:
Figure 4:
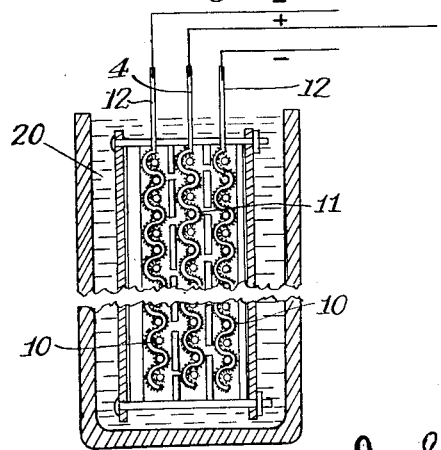

In the drawing, Fig. 1 is an elevation of an anode made according to a preferred form of my invention; Fig. 2 is a section on an enlarged scale through the anode shown in Fig. 1; Fig. 3 is a vertical section through an assembly of the anode shown in Fig. 2, with cathodes made according to my invention; and Fig. 4 is a vertical section through a cell embodying the electrode assembly shown in Fig. 3. The thickness of the electrodes in Figs. 2, 3 and 4 is exaggerated for convenience of illustration.

One of the electrode sections is illustrated in Fig. 1 of the drawing which accompanies and is a part of this specification, wherein 1 illustrates the strands of a woven nickel cloth, 2 the spray deposit coating thereon and 3 the nickelous oxide coating thereon and 4 the conducting terminal extending from this plate or section.

The section of nickel cloth properly coated as described is next assembled with adjacent cathode plates of either iron or other suitable metal such as nickel or zinc as illustrated in Fig. 3 of the drawing, wherein 10 illustrates the negative or cathode plate cut to a similar size and shape to that of the anode formed plate 11. These cathode plates 10 which may also be of sprayed metal on a conductive or non-conductive perforate base material and having electrical terminals 12 of conductive material attached thereto and extending therefrom are placed on either side of the positive plate 11 with a spacer 13 of porous nature such as asbestos, paper or gauze of cotton or glass fiber therebetween.

Multiple assemblies of as many plates as desired obviously may be made.

After the anode and cathodes are lined up they may be clamped together by bolts 14 and plates 15 of stiff material or by other means so that a minimum space is occupied by the assembly and so that the positive and negative plates are as near to each other as possible to reduce internal resistance.

After this assembly is made, the assembly is immersed in a solution 20, see Fig. 4 of say five percent caustic soda or caustic potash and the positive plate 11 and the negative plates 10 are subjected to further formation by connecting the terminal 4 of the positive plate 11 to a source of direct current, the negative plates being connected to the source through terminals 12 to complete the circuit. This formation is preferably repeated a number of times to be certain that all the capacity attainable is built up as is well known.

I have found that an assembly made of a nickel wire screen spray coated with nickel and formed as above described and being eighteen square inches in plane area will discharge at the rate of 250 milliamperes for one hour and a half whereas a plain nickel screen so formed will discharge for only about four to five minutes with same discharge rate.

Thus the ampere time capacity was increased about fifteen times by my method of spray deposit.

Various modifications of structure are evident to those versed in the art and it is understood that my patent is not limited to the preferred forms disclosed herein.

For instance, certain oxides which are suitable for use in electrolytic cells may be compressed or made into a layer and subjected thereafter to heat and a reducing atmosphere such as of hydrogen and in this way a finely divided layer or mass of fine metal particles suitable for use similar to that described here may be made. Another obvious method of making these plates or electrodes is to mass a layer of finely divided metal and subject this to a fusing temperature preferably in a non-oxidizing atmosphere.

For instance, positive plates may be spray coated with nickel and base materials into which the spray is deposited may consist of glass or porcelain, glass cloth or fiber cotton gauze or thermoplastic materials and the terminals may be attached by and consist of various conductive materials and the negative plates may consist of zinc, iron, cadmium or cadmium and iron or other suitable metals sprayed in a porous base or plain metal may be used for the negative plates though less advantageous.

Also greater capacities are attainable if multiple spraying and forming is resorted to alternately.

Also greater capacities are attainable if pasting is resorted to of nickelous oxide or the oxides suitably filled with metallic carriers as is well known.

Also great capacity cells may be built by covering a body of oxides and carriers with the porous base material as cloth and then spraying thereon to make the plates. Thus cotton or glass cloth tubular fabrics may be filled with or woven around forms of oxides and metallic carriers and then coated with metal spray.

Additional porosity in the electrode surface may be developed by spraying alloys or two dissimilar metals simultaneously and subsequently dissolving out one of these. Thus copper and nickel may be sprayed simultaneously and the copper subsequently dissolved out leaving a spongy porous mass or layer of nickel.

Having thus described my invention, I claim:

1. Method of making a porous electrode for accumulators by spraying two or more metals upon a suitable base to form a porous mass of adhering particles and subsequently dissolving out the particles composed of at least one of these sprayed metals.

2. An electrode for accumulators comprising a base of porous material having a spray-deposited porous conductive layer of minute metallic particles thereon.

3. An electrode for accumulators comprising a woven fabric base having a spray-deposited conductive layer of minute metallic particles thereon.

4. An electrode for accumulators comprising a porous flexible base of non-conductive material having a conductive spray-deposited layer of finely divided metallic particles thereon and adhering thereto.

5. An electrode for an electric accumulator comprising a porous flexible base of woven glass cloth having a conductive spray-deposited layer of finely divided metallic particles thereon and adhering thereto.

6. An electrode for electrolytic storage cells comprising a reticulated porous surface composed of a spray-deposited layer of minute cohering particles of metal and an oxide coating formed on the surfaces of said cohering particles.

7. An electrode for electrolytic storage cells comprising a woven fabric base having a reticulated porous surface composed of minute cohering spray-deposited particles of metal and an oxide layer formed thereon.

8. In an electric storage cell a conductive electrolyte, an electrode adapted to be immersed therein and comprising a spray-deposited porous base and having a porous conductive surface of reactive metal thereon and having an oxide layer formed coextensive with the irregularities in the porous surface of the reactive metal.

9. The method of making electrodes for electrolytic accumulators which includes the steps of securing an electrical conductor to a strip of porous non-conducting material, spraying at least a portion of the area of said strip with finely divided particles of molten metal whereby said particles make electrical and mechanical contact with each other and with said conductor and thereafter electro-forming a layer of active material on the surfaces of said particles.

10. The method of making an electrode for an alkaline storage cell which comprises forming a support for the active material thereof by spraying finely divided molten metal upon a suitable base to form a porous conductive layer of finely divided cohering particles, and thereafter depositing the hydrate of that metal in the interstices of the porous layer.

JOSEPH B. BRENNAN.